Patented Apr. 24, 1951

2,550,139

UNITED STATES PATENT OFFICE 2,550,139

BLENDS OF BUTADIENE-ACRYLONITRILE RUBBERY COPOLYMERS HAVING A TOLUENE-INSOLUBLE "B" GEL CONTENT OF FROM 30 TO 50% AND HARD RESINOUS STYRENE-ACRYLONITRILE COPOLYMERS

Lawrence E. Daly, Mishawaka, Ind., assignor to United States Rubber Company, New York, N. Y., a corporation of New Jersey No Drawing. Application November 12, 1948, Serial No. 59,779

4 Claims. (Cl. 260—45.5)

This invention relates to thermoplastic molding compositions, more particularly to tough, horny compositions made from rubbery butadiene-acrylonitrile copolymers mixed with styrene-acrylonitrile copolymer resins. Still more particularly the present invention relates to elastomer-resin compositions of the foregoing type having improved low temperature properties.

The preparation of tough, horny compositions made from rubbery butadiene-acrylonitrile copolymers mixed with hard normally inelastic styrene-acrylonitrile copolymer resins and a description of the resulting mixtures may be found in U. S. Patent No. 2,439,202 issued to the present applicant. However, a serious problem encountered in commercial production of these materials has been a lack of smoothness in the surface of the sheets. This defect has been termed an "orange peel effect" because of its similarity to the surface of an orange. While this orange peel effect disappears upon heating the material in contact with a perfectly smooth surface such as a polished platen, it reappears upon subsequently heating the material out of contact with such a smooth metallic surface. The orange peel effect is a very serious defect except on very heavy grained material where it does not show to an objectionable extent. This roughness seriously detracts from the appearance of a finished article which is intended to have a perfectly smooth surface. Closely tied up with this disadvantage are the processing difficulties which are particularly noticeable on large scale production. These difficulties include failure of the material to mix together readily and quickly on the rubber mill or in the Banbury, failure of the material to "hug" the rolls of the rubber mill, and difficulty in sheeting the material from the mill in the proper width. In addition the material does not calender as easily as is desired.

Another problem encountered in commercial production of the elastomer-resin materials mentioned above has been that when they are made without a liquid plasticizer they are deficient for applications which require impact resistance at a low temperature, such as at temperatures below the freezing point of water, say in the vicinity of 20° F. and lower. At such low temperatures, articles molded from these compositions have a tendency to crack or shatter under sharp impact.

Ordinarily, the solution to the problem of poor low temperature physical properties of thermoplastic resinous compositions may be found in adding a high boiling liquid plasticizer thereto. This is only a partial solution, however, because the softening point of thermoplastic materials at elevated temperatures is reduced thereby in direct proportion to the reduction in shatter point. Thus these compositions become unsatisfactory for application where they are required to remain rigid at temperatures above 160° F. Furthermore liquid plasticizers are appreciably volatile and show a marked tendency to migrate with the result that after a relatively short time the plasticizer fails to be effective.

It is an object of the present invention to overcome the disadvantages enumerated above and to produce a hard, tough, thermoplastic molding composition of the type described above which is free from the "orange peel effect" or roughness mentioned above. Another object is to provide a composition which in addition retains substantially all of its exceptional room temperature impact resistance in the temperature range of 20° F. and lower, say from +10 to 0° F. without the aid of a liquid plasticizing agent. Another object is to achieve these results without adversely affecting the properties of the elastomer-resin composition at room temperature and at elevated temperatures. Other objects of the present invention will more fully hereinafter appear.

The present invention is based on the discovery that the processing difficulties and the roughness and orange peel effect incident to the use of the standard normally elastic rubbery copolymer of butadiene-1,3 and acrylonitrile in conjunction with a hard normally inelastic resinous thermoplastic copolymer of from 50 to 85% of styrene and correspondingly from 50 to 15% of acrylonitrile may be overcome by building up the toluene-insoluble "B" or tight gel content of the rubbery butadiene-acrylonitrile copolymer to at least 30% and less than 50%, prior to intermixture with the styrene-acrylonitrile resinous copolymer. This result was completely unexpected because the art had previously supposed that the presence of any substantial proportion of toluene-insoluble "B" gel in the rubbery copolymer constituent of the elastomer-resin mixture was undesirable and to be avoided because it was thought to adversely affect the physical properties of the resulting elastomer-resin composition.

The present invention is also based on the discovery that by the use of a rubbery copolymer of butadiene and acrylonitrile which has been pre-gelled to a toluene-insoluble "B" gel content of at least 30% and less than 50%, in conjunction with a resinous copolymer of styrene and acrylonitrile which has an intrinsic viscosity measured in dimethyl formamide by the standard method used in the art of from 1 to 2 and an acrylonitrile content of from 20 to 30%, the styrene content of the resin correspondingly ranging from 80 to 70%, the impact resistance of the resulting compositions at temperatures of 20° F. and lower, say 10° F. to 0° F., is greatly enhanced. As the intrinsic viscosity and acrylonitrile content of the resin increase above these values, the resin is harder and more brittle which results in elastomer-resin compositions which have undesirably low impact values at low temperatures, say below 20° F. Resins having an intrinsic viscosity below 1.0, say from 0.5 to 1.0, can be used but in general result in compositions having lower heat distortion values and lacking the desired rigidity.

The hard, tough thermoplastic compositions of the present invention contain from 50 to 90% of the styrene-acrylonitrile resin based on the weight of the resin and the rubbery copolymer. The rubbery copolymer content of my compositions ranges correspondingly from 50 to 10%.

The rubbery copolymer of butadiene and acrylonitrile which is employed as a starting material in the practice of the present invention is a well-known article of commerce, being commonly known as Buna N and being made in a manner well-known to those skilled in the art, usually by emulsion polymerization for example in accordance with U. S. Patent No. 1,973,000. The styrene-acrylonitrile resinous copolymer used in conjunction with the pre-gelled butadiene-acrylonitrile rubbery copolymer in the practice of my invention is also a well-known material, its manufacture being detailed in U. S. Patent No. 2,439,202 mentioned above. A styrene-acrylonitrile resinous copolymer having an acrylonitrile content of from 20 to 30% and an intrinsic viscosity of from 1.0 to 2.0 can be made following the teachings of Patent No. 2,439,202. As is well known to those skilled in the art, the relative proportions of styrene and acrylonitrile in the monomeric charge determine the percentage of acrylonitrile in the finished polymer. The percentage of acrylonitrile in the finished polymer is not, however, the same as in the charge. For example, a 50–50 charge will give an acrylonitrile content in the polymer of the order of 45% whereas a charge of 15% acrylonitrile and 85% styrene will give a polymer having an acrylonitrile content of the order of 12–13%. Those skilled in the art can readily select a monomeric charge giving a polymer containing 20–30% combined acrylonitrile. As to intrinsic viscosity, this is affected by the nature and the amount of the modifier used. Increasing the amount of the modifier, such as dodecyl mercaptan, will effect a decrease in the intrinsic viscosity of the polymer. Thus, one skilled in the art can readily select an amount of modifier such as to produce a polymer having an intrinsic viscosity within the above limits. Furthermore, several styrene-acrylonitrile resinous copolymers are available commercially, and one skilled in the art can by standard methods of analysis select from these resins having the preferred acrylonitrile content and intrinsic viscosity set out above.

The preferred method of imparting the desired toluene-insoluble "B" gel content of at least 30% but less than 50% to the rubbery copolymer consists of masticating this rubbery copolymer at an elevated temperature for an extended period of time. Temperatures of the order of 280° to 340° F. are generally employed in this mastication, temperatures of from 300° to 320° F. being preferred. The time of mastication will depend upon the particular temperature used but will ordinarily range from 30 to 90 minutes. To build up a 30% toluene-insoluble "B" gel content typically requires mastication for from 30 to 60 minutes at 300° to 320° F. while to build up a toluene-insoluble "B" gel content of about 45% will require mastication for about 90 minutes at 300° to 320° F. The time and temperature at which the mastication is conducted are co-related, the time being shorter at the higher temperature. The mastication may be carried out in a Banbury mixer or on an open rubber mill of conventional type. The hot grinding or milling builds up what is known as "B" gel, which is the portion of the treated rubber that is insoluble in toluene or benzene. "B" gel cannot be converted into a soluble gel by either hot or cold mastication. In practicing the present invention it has been found essential to build up the insoluble "B" gel in the rubbery copolymer employed to at least 30% but less than 50% by weight. If the copolymer rubber is mixed with the resin without first having had its gel content built up in the manner described, the resulting composition will sheet off the calender in very rough uneven sheets.

The percentage of toluene-insoluble "B" gel in the elastomer used in the present invention may be determined by standard procedure in the art for example by extracting a 0.2 gram sample of the masticated Buna N in toluene at room temperature for at least 24 hours, drying the sample over a steam bath and determining the amount of insoluble gel. The "B" gel content is the ratio of the weight of the insoluble dried sample to the weight of the original sample.

During or near the end of the mastication of the rubbery copolymer, I prefer to add and intimately incorporate therewith a heat stabilizer to control the rate of gelation and keep the gelation from reaching the figure of 50% toluene-insoluble "B" gel. The preferred heat stabilizer is a mixture of mono- and di-heptyl diphenylamines. Other heat stabilizers which can be used are 2,5-ditertiary butyl para cresol and phenyl beta naphthylamine. While the heat stabilizing agent may be added to the rubbery copolymer before mastication is begun in which event it serves to prevent the toluene-insoluble "B" gel content from building up too rapidly, it is often preferred to incorporate it near the end of the mastication period, say at a point sufficiently before the end of mastication to insure the attainment of an intimate homogenous mixture. The amount of the heat stabilizer employed may vary rather widely, say between 0.5 and 10% based on the rubbery copolymer, but it is often preferred to employ from 1 to 2% thereof based on the weight of the rubbery copolymer.

The pre-gelled rubbery copolymer and the styrene-acrylonitrile resinous copolymer may be admixed with each other in any suitable manner which results in the formation of an intimate homogeneous mixture, say in a Banbury mixer, or on a rubber mill or in any other suitable mixing apparatus. As the amount of the resinous copolymer is increased, the hardness, the toughness and the tensile strength of the resulting composition increases. The resulting homogeneous mixture is then usually calendered into a continuous thin sheet on a conventional rubber calender whereupon several plies of the thin calendered sheet material are plied up and molded into a sheet of suitable thickness by subjection to heat and pressure, for example in a hydraulic press at pressures in the range of 200 to 1,000 lbs. per sq. in. and at a platen temperature of 300° to 335° F. The platens of the presses are then cooled to bring the temperature of the composition down to about 150° to 180° F. whereupon it is removed from the press. Instead of molding in a platen press, the calendered sheets may be tiered and heated under mechanical pressure in a chamber with live steam and then cooled.

The resin and the rubbery copolymer are generally admixed at temperatures in same range as that used in the pre-gelling of the rubbery copolymer, although this is not absolutely essential where a stabilizer is incorporated as described above for the reason that such a heat stabilizer operates to prevent the building up of the gel content during the admixture of the resin with the rubbery copolymer even though such admixture is effected at temperatures above 340° F.

In formulating the elastomer-resin mixtures of the present invention additional ingredients such as coloring materials, fillers, and if desired, vulcanizing ingredients for the rubbery copolymer may be incorporated therewith. It is usually preferred not to vulcanize because when the mixture is not vulcanized the scrap stock can be reused. Where it is desired to use vulcanization, the vulcanizing agent is usually sulfur in an amount sufficient to cure the elastomer content of the mixture to a soft vulcanized state if it were cured alone, whether or not all of the sulfur combines with the rubber component.

Plasticizers such as dibutyl sebacate, dioctyl phthalate, etc., may also be added to the composition of the present invention. For example 5 parts of dibutyl sebacate per 100 parts of elastomer-resin mixture will improve the low temperature impact strength of the composition of the present invention but, as indicated previously, the structural rigidity of the resulting material is adversely affected at temperatures above 160° F. For this reason I generally prefer not to use such liquid plasticizers. One of the most important features of my invention is that the use of such plasticizers with their attendant disadvantages is rendered completely unnecessary.

A peculiar aspect of my invention is the fact that although the rubbery copolymer of butadiene and acrylonitrile after having been brought to a toluene-insoluble "B" gel content of from 30% to less than 50% is quite rough on the mill, it smooths out upon addition of the resinous styrene-acrylonitrile copolymer thereto to give a mixture which can be calendered into smooth sheets.

The rubbery copolymers of butadiene and acrylonitrile which are pre-gelled and employed in the practice of the present invention are the ordinary commercially available materials typically containing from 18 to 48% of acrylonitrile and correspondingly from 82 to 52% of butadiene-1,3. As disclosed in my copending application Serial No. 59,780 filed of even date herewith, now Patent No. 2,505,349, April 25, 1950, it is often preferred to employ a mixture of a relatively high acrylonitrile rubbery copolymer, i. e., a copolymer of from 35 to 48% of acrylonitrile and correspondingly from 65 to 52% of butadiene and a relatively low acrylonitrile rubbery copolymer, i. e., a rubbery copolymer of from 18 to 26% of acrylonitrile and correspondingly from 82 to 74% of butadiene, these copolymers preferably having been pre-gelled to a content of at least 30 and less than 50% to toluene-insoluble "B" gel and these two types of rubbery copolymers being employed in such proportions that each is present in amount ranging from 25 to 75% by weight of the sum of the two rubbery copolymers.

The following examples illustrate my invention in more detail.

*Example 1*

One hundred parts of commercially available butadiene-acrylonitrile rubber containing 35% of acrylonitrile is hot milled on an open rubber mill at 300 to 320° F. for 30 minutes. This builds up the toluene-insoluble "B" gel content to from 30 to 35%. Near the end of the milling period, 2 parts of a mixture of mono- and di-heptyl diphenylamines is added and is intimately milled into the rubber to prevent the gel content from increasing during the subsequent processing operations. Thirty parts by weight of the resulting rubber is intimately blended with 70 parts by weight of a styrene-acrylonitrile resin containing 27–28% acrylonitrile and having an intrinsic viscosity of 1.32, on the rubber mill. The pre-gelled Buna N used herein is quite rough but smooths out upon addition of the resin so that the mixture can be calendered into smooth sheets. These calendered sheets are plied together in the manner described to give a one-eighth inch stock. The resulting product has notched impact strengths of 3.0 at 0° F. and of 14.0 at room temperature (measured in the Charpy machine, ASTM D256–43T method).

If in Example 1 a styrene-acrylonitrile resin having an intrinsic viscosity of 2.5 to 3 is employed in place of the styrene-acrylonitrile resin having an intrinsic viscosity of 1.32 used in that example, the resulting elastomer-resin blend shatters badly when subjected to sharp impact at temperatures of the order of 20° F. or lower.

If in Example 1 a Buna N rubber without gel is used the resulting elastomer-resin composition is extremely rough and full of small holes as it is sheeted from the calender. Molded sheets made from this stock are relatively smooth if molded in contact with a highly polished platen but upon reheating as for example in shaping operations the roughness reappears.

*Example 2*

One hundred parts of commercially available Buna N of the type known as Perbunan 35 NS–90 was ground 15 minutes in a Banbury mixer at a temperature of 325–340° F., three parts of triphenyl phosphite as an anti-oxidant being added after 13 minutes of grinding. The toluene-insoluble "B" gel content after mastication was about 32% and the Mooney viscosity was 74. One hundred and two pounds of the resulting material was charged into a Banbury mixer followed by a styrene-acrylonitrile resin (intrinsic viscosity 1.32, containing 27–28% acrylonitrile) added in three portions, the total amount of resin added being 237 lbs. The mixing was continued and ten parts of dibutyl sebacate was then added together with a suitable amount of pigment. The total mixing time was 14 to 15 minutes. The material sheeted very easily from the sheeting mill and hugged the rolls very well. It was calendered into sheets of 30 gauge. These sheets were pressed to give a material one-eighth inch in thickness which had the following physical characteristics:

Tensile strength 1800 lbs./sq. in.
Elongation 90%
Heat distortion temperature 175° F.

The resulting stock could not be shattered by a hammer blow at temperatures as low as —5° F.

*Example 3*

Pre-ground Perbunan 35 NS-90, ground as in the preceding example, was used in conjunction with styrene-acrylonitrile resin having an intrinsic viscosity of 1.78 and containing 27.6% acrylonitrile in making dark red hardboard in accordance with the following formulation:

|  | Pounds | Ounces |
|---|---|---|
| Pre-ground Perbunan (32% gel) | 27 | 0 |
| Styrene-acrylonitrile resin | 63 | 0 |
| Zinc Oxide | 9 | 0 |
| Red iron oxide | 4 | 8 |
| Brown pigment | 3 | |
| Carbon black pellets | 0 | 14 |
| Dibutyl sebacate | 4 | 8 |
| Polyester resin plasticizer (of the type disclosed at Ind. Eng. Chem., 37, 504 (1945)) | 4 | 8 |

The rubber and the resin were mixed together in a Banbury mixer for five minutes whereupon the rest of the ingredients were added and milling was continued to a total time of 10 minutes. The temperature ranged from 300° F. to 340° F. The resulting material was calendered into thin sheets which were plied up as described above. The resulting product exhibited good impact resistance over temperatures ranging from —10° F. to 160° F.

In this specification all percentages, proportions and parts are by weight.

Having thus described my invention, what I claim and desire to protect by Letters Patent is:

1. The process of making a hard, tough, thermoplastic elastomer-resin mixture which comprises masticating at a temperature of from 280° to 340° F. a normally elastic rubbery copolymer of butadiene-1,3 and acrylonitrile until it has a toluene-insoluble "B" gel content of at least 30 but less than 50 per cent, said toluene-insoluble "B" gel being incapable of conversion into a soluble gel by mastication, and then intimately and homogeneously incorporating the resulting rubbery copolymer with a hard normally inelastic resinous thermoplastic copolymer of from 50 to 85 per cent of styrene and correspondingly from 50 to 15 per cent of acrylonitrile, said copolymers being employed in proportions of from 50 to 90 per cent by weight of said resinous copolymer and correspondingly from 50 to 10 per cent by weight of said rubbery copolymer, said last-named percentages being by weight based on the sum of the weights of said resinous and rubbery copolymers.

2. As a new article of manufacture, a hard, tough thermoplastic homogeneous mixture prepared by the process of claim 1.

3. The process of making a hard, tough, thermoplastic elastomer-resin mixture which comprises masticating at a temperature of from 280° to 340° F. a normally elastic rubbery copolymer of butadiene-1,3 and acrylonitrile until it has a toluene-insoluble "B" gel content of at least 30 but less than 50 per cent, said toluene-insoluble "B" gel being incapable of conversion into a soluble gel by mastication, and then intimately and homogeneously incorporating the resulting rubbery copolymer with a hard normally inelastic resinous thermoplastic copolymer of styrene and acrylonitrile, said resinous copolymer having an intrinsic viscosity measured in dimethyl formamide of from 1 to 2 and an acrylonitrile content of from 20 to 30 per cent, said copolymers being employed in proportions of from 50 to 90 per cent by weight of said resinous copolymer and correspondingly from 50 to 10 per cent by weight of said rubbery copolymer, said last-named percentages being by weight based on the sum of the weights of said resinous and rubbery copolymers.

4. As a new article of manufacture, a hard, tough thermoplastic homogeneous mixture prepared by the process of claim 3.

LAWRENCE E. DALY.

REFERENCES CITED

The following references are of record in the file of this patent:

UNITED STATES PATENTS

| Number | Name | Date |
|---|---|---|
| 2,317,385 | Koch et al. | Apr. 27, 1943 |
| 2,439,202 | Daly | Apr. 6, 1948 |
| 2,453,052 | Van Etten | Nov. 2, 1948 |

OTHER REFERENCES

Young et al., Industrial and Engineering Chemistry, vol. 39, pages 1446-1452 (Nov. 1947).

White et al., pages 770-775, Aug. 1945, Ind. and Eng. Chem

Schoene et al., pp. 1246-1249, Dec. 1946, Ind. and Eng. Chem.